(12) United States Patent
Marconnet et al.

(10) Patent No.: US 10,436,377 B2
(45) Date of Patent: Oct. 8, 2019

(54) MULTILAYER DUCT AND METHOD FOR MANUFACTURING SAME AND FLEXIBLE STRIP ABLE TO FORM A LAYER OF SAID DUCT

(71) Applicant: TRELLEBORG INDUSTRIE, Clermont-Ferrand (FR)

(72) Inventors: Loïc Marconnet, Estandeuil (FR); Ludovic Dumoulin, Le Crest (FR)

(73) Assignee: TRELLEBORG INDUSTRIE, Clermont-Ferrand (FR)

( * ) Notice: Subject to any disclaimer, the term of this patent is extended or adjusted under 35 U.S.C. 154(b) by 192 days.

(21) Appl. No.: 15/531,651

(22) PCT Filed: Nov. 20, 2015

(86) PCT No.: PCT/FR2015/053149
§ 371 (c)(1),
(2) Date: May 30, 2017

(87) PCT Pub. No.: WO2016/087739
PCT Pub. Date: Jun. 9, 2016

(65) Prior Publication Data
US 2017/0328510 A1    Nov. 16, 2017

(30) Foreign Application Priority Data
Dec. 3, 2014    (FR) ...................... 14 61840

(51) Int. Cl.
*F16L 57/06*    (2006.01)
*F16L 11/10*    (2006.01)
(Continued)

(52) U.S. Cl.
CPC ............... *F16L 57/06* (2013.01); *F16L 11/10* (2013.01); *F16L 11/12* (2013.01); *F16L 11/16* (2013.01)

(58) Field of Classification Search
CPC .. F16L 57/06; F16L 11/10; F16L 11/12; F16L 11/16
(Continued)

(56) References Cited

U.S. PATENT DOCUMENTS 317,530 A * 5/1885 Grubb ................. B29C 66/1122
156/91
1,027,571 A * 5/1912 Siegwart ................. B29C 70/86
138/151

(Continued)

FOREIGN PATENT DOCUMENTS

DE     1019132      11/1957
WO     2008/119395  10/2008

OTHER PUBLICATIONS

Search Report dated Jul. 29, 2015.
International Search report dated Feb. 3, 2016.

*Primary Examiner* — Craig M Schneider
*Assistant Examiner* — David R Deal
(74) *Attorney, Agent, or Firm* — IPSILON USA, LLP

(57) ABSTRACT

A multilayer pipe (1) having at least one layer (2) comprising a strip (3) wound helically in the form of touching turns, said strip (3) comprising a longitudinal support (4) and protective tiles (5) fastened to said support (4), said protective tiles (5) being organized on said support (4) in parallel rows (6), each row (6) of tiles being separated from an adjacent row (6) of tiles by an empty space forming a line (7) of separation, the lines (7) of separation being parallel to one another. Each of the lines (7) of separation between rows (6) of tiles (5) extends in a plane perpendicular to the longitudinal axis of the pipe (1).

11 Claims, 4 Drawing Sheets

US 10,436,377 B2

Page 2

(51) Int. Cl.
*F16L 11/16* (2006.01)
*F16L 11/12* (2006.01)

(58) Field of Classification Search
USPC ........ 138/141, 110, 140, 149, 153, 172, 177
See application file for complete search history.

(56) References Cited

U.S. PATENT DOCUMENTS

| | | | | |
|---|---|---|---|---|
| 2,532,190 | A * | 11/1950 | Marcello | F23M 5/02 |
| | | | | 264/30 |
| 3,044,499 | A * | 7/1962 | Rudolf | F16L 9/10 |
| | | | | 138/143 |
| 3,460,305 | A * | 8/1969 | Long | C04B 35/6313 |
| | | | | 343/872 |
| 3,960,630 | A * | 6/1976 | Pataki | B29C 53/60 |
| | | | | 156/190 |
| 4,073,318 | A | 2/1978 | Close et al. | |
| 4,304,267 | A * | 12/1981 | Campbell, Jr. | C04B 30/02 |
| | | | | 138/149 |
| 4,484,969 | A | 11/1984 | Klimpl | |
| 4,526,208 | A * | 7/1985 | Klimpl | B28B 11/14 |
| | | | | 138/144 |
| 4,732,177 | A * | 3/1988 | Maus | F16L 59/123 |
| | | | | 138/147 |
| 7,303,359 | B1 * | 12/2007 | Damman | F16L 57/06 |
| | | | | 138/97 |
| 8,136,649 | B2 * | 3/2012 | Burstrom | B65G 11/166 |
| | | | | 193/25 E |
| 10,112,065 | B2 * | 10/2018 | Foerg | A62C 2/06 |
| 2008/0169642 | A1 * | 7/2008 | Yang | B65G 53/523 |
| | | | | 285/16 |

* cited by examiner

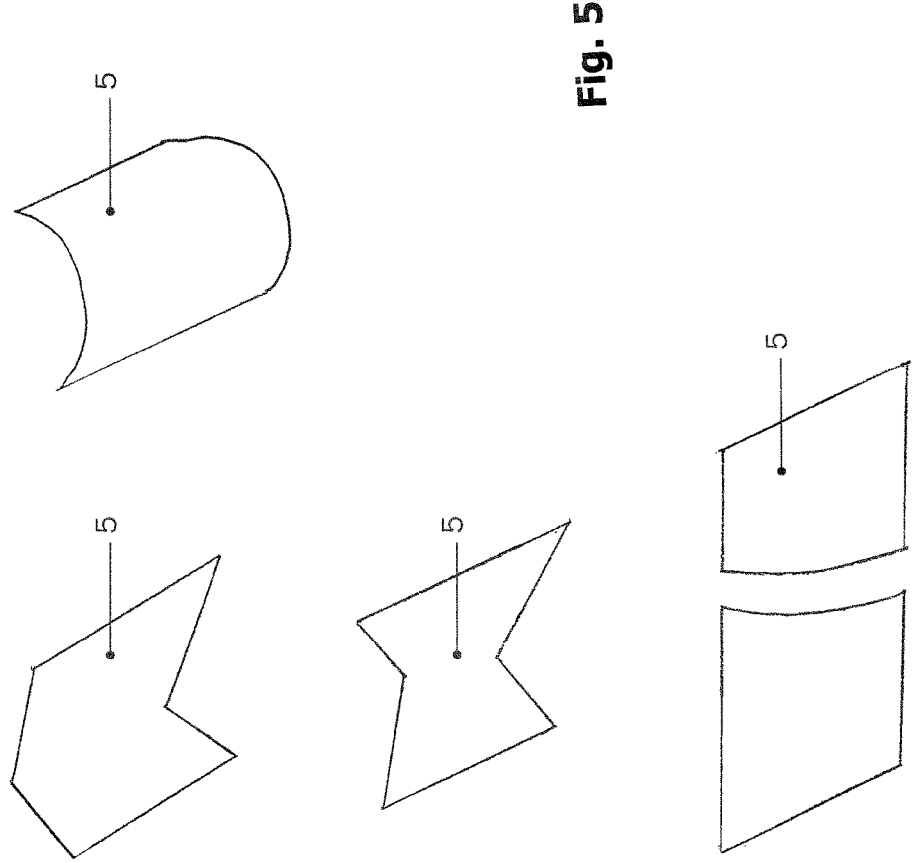

MULTILAYER DUCT AND METHOD FOR MANUFACTURING SAME AND FLEXIBLE STRIP ABLE TO FORM A LAYER OF SAID DUCT

RELATED APPLICATION

This application is a National Phase of PCT/FR2015/053149, filed on Nov. 20, 2015 which in turn claims the benefit of priority from French Patent Application No. 14 61840, filed on Dec. 3, 2014, the entirety of which are incorporated by reference.

BACKGROUND

Field of the Invention

The present invention relates to a multilayer pipe, in particular for transporting abrasive materials, and to its method of fabrication, and also to a flexible strip suitable for forming a layer of said pipe.

The invention relates more particularly to a multilayer pipe having at least one layer comprising a strip wound helically in the form of touching turns, said strip comprising a longitudinal support and protective tiles fastened to said support, said protective tiles being organized on said support in rows presenting rectilinear longitudinal edges that are substantially parallel, each row of tiles being separated from an adjacent row of tiles by an empty space forming a line of separation, the lines of separation being parallel to one another.

DESCRIPTION OF RELATED ART

Such flexible pipes, which may be connected to propulsion means or to suction means, suffer rapid wear, in particular when they are used for transporting abrasive materials. To limit such wear, protective tiles made of a material that withstands abrasion, such as a ceramic, are used for fabricating the pipe, as illustrated by way of example in international application WO 2008/119395 or Document U.S. Pat. No. 4,484,969. The protective tiles are adhesively bonded to a support that is in the form of strip material. The assembly made up of the support and the protective tiles constitutes a strip that is wound helically around a mandrel to form one of the layers of said pipe. In order to make a straight cut through such a pipe, it is necessary to cut the ceramic. To solve that problem, certain manufacturers have devised a pipe in which the abrasion-resistant layer of the pipe is not formed by a strip of tiles but by ceramic rings coaxial about a common axis and offset axially along the pipe, as illustrated in documents WO 2010/115414 and EP 1 877 689. Nevertheless, such solutions are more difficult to fabricate.

OBJECTS AND SUMMARY

An object of the present invention is to propose a pipe of design that enables the pipe to be cut straight without detracting from the simplicity with which said pipe can be fabricated.

To this end, the invention provides a multilayer pipe having at least one layer comprising a strip wound helically in the form of touching turns, said strip comprising a longitudinal support and protective tiles fastened to said support, said protective tiles being organized on said support in rows presenting rectilinear longitudinal edges that are substantially parallel, each row of tiles being separated from an adjacent row of tiles by an empty space forming a line of separation, the lines of separation being parallel to one another, the pipe being characterized in that each of the lines of separation between rows of tiles extends in a plane perpendicular to the longitudinal axis of the pipe.

By the way the rows of tiles are arranged, it is possible for the pipe to be straight cut without detracting from the simplicity with which the pipe can be fabricated as a result of it being possible, while fabricating said pipe, for the strip supporting the protective tiles to be wound helically. The lines of separation also make it possible to guarantee that the pipe is flexible.

Preferably, each line of separation, of length equal to the circumference of the pipe at the level of said layer, extends from one longitudinal edge to the other longitudinal edge of the strip while forming a non-zero angle other than 90° with each of the longitudinal edges of the strip, and at least one of the transverse end edges of the strip is a "chamfered" edge extending parallel to the lines of separation.

Preferably, the angle between each line of separation and one of the longitudinal edges of the strip lies in the range 20° to 80°, and is preferably close to 45°.

Preferably, each row of tiles is made up of n series of protective tiles, n being an integer; when n is equal to 1, each tile of said series of tiles presents at least two substantially parallel edges suitable for forming the longitudinal edges of said row of tiles; and when n is equal to or greater than 2, each tile of at least two series of tiles presents at least one rectilinear edge suitable for forming a longitudinal edge of the row of tiles, each rectilinear longitudinal edge of a row of tiles being formed by aligning rectilinear edges of at least some of the tiles of said row.

Preferably, each protective tile is made of a material that withstands abrasion and is preferably selected from the group formed by ceramics.

Preferably, the protective tiles are fastened to the support by adhesive.

Preferably, the longitudinal support is a tape.

Preferably, the layer that is in the form of a helically-wound tape comprising a support together with protective tiles, is adjacent to a layer formed of an elastically deformable material that becomes inserted at least in part between said tiles in the lines of separation between rows of tiles.

The invention also provides a method of using a mandrel to fabricate a multilayer pipe, the method comprising a step of fabricating a layer of said pipe by helically winding in touching turns a strip comprising a longitudinal support and protective tiles fastened to said support, said protective tiles being organized on said support in rows presenting rectilinear longitudinal edges that are substantially parallel, each row of tiles being separated from an adjacent row of tiles by an empty space forming a line of separation, the lines of separation being parallel to one another, the method being characterized in that during the step of helically winding the strip around the mandrel, each line of separation is arranged in a plane perpendicular to the longitudinal axis of the mandrel.

In a preferred implementation of the method, each line of separation, of length equal to the circumference of the pipe to be made at the level of said layer, extends from one longitudinal edge to the other longitudinal edge of the strip while forming a non-zero angle α other than 90° with each of the longitudinal edges of the strip, and each transverse end edge of the strip is a "chamfered" edge extending parallel to the lines of separation, and the winding step is started by winding one of the transverse end edges of the strip around the mandrel in a circumferential plane of the mandrel.

The invention also provides a flexible strip of the type suitable for being wound helically in the form of a winding of touching turns around a mandrel, in particular to make a layer of a pipe of the above-specified type, said strip comprising a longitudinal support and protective tiles fastened to said support, said protective tiles being organized on said support in rows presenting rectilinear longitudinal edges that are substantially parallel, each row of tiles being separated from an adjacent row of tiles by an empty space forming a line of separation, the lines of separation being parallel to one another, the strip being characterized in that each line of separation, of length equal to the circumference of the winding, extends from one longitudinal edge to the other longitudinal edge of the strip while forming a non-zero other than 90° with each of the longitudinal edges of the strip, and in that at least one of the transverse end edges of the strip is a "chamfered" edge extending parallel to the lines of separation.

BRIEF DESCRIPTION OF THE DRAWINGS

The invention can be well understood on reading the following description of embodiments, given with reference to the accompanying drawings, in which:

FIG. 5 shows example shapes for tiles that are suitable for making a row of tiles.

DETAILED DESCRIPTION

Figure 1:
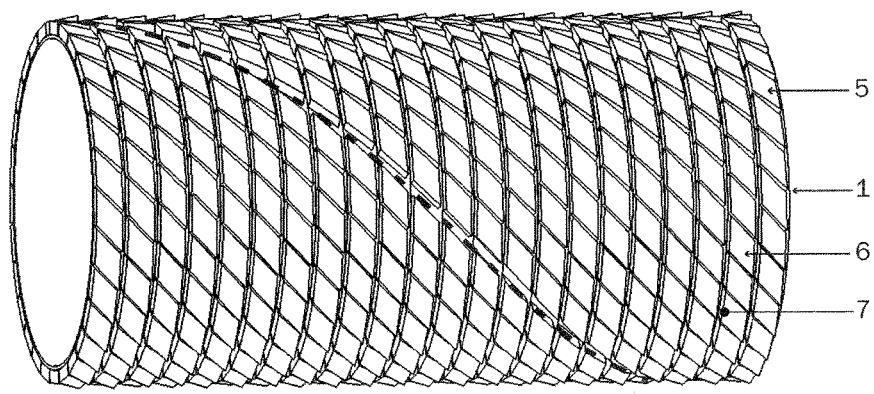
FIG. 1 is a perspective view of a pipe in accordance with the invention shown at a stage in the fabrication of the pipe that corresponds to the stage when the layer formed by a strip of ceramic tiles can be seen.
Figure 2:
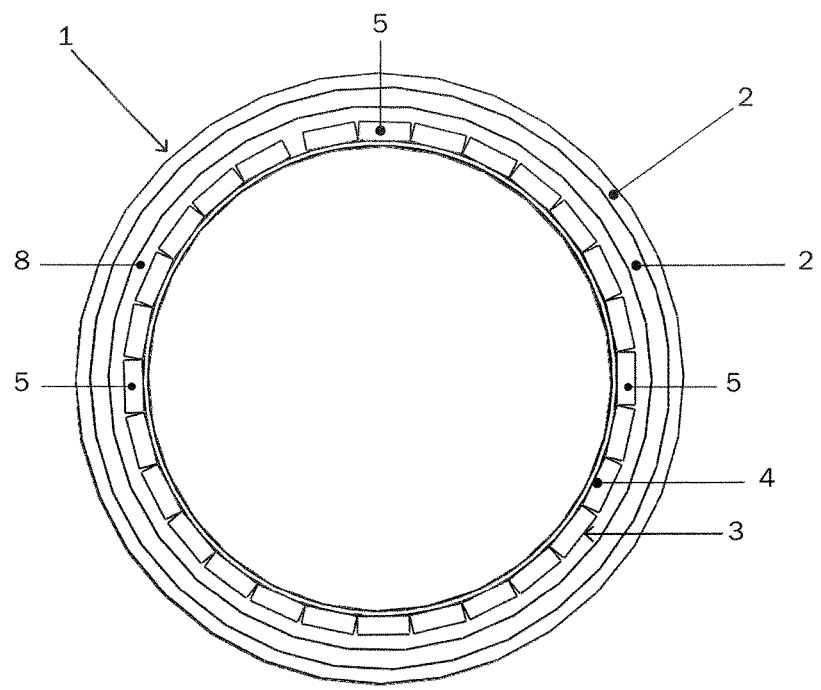
FIG. 2 is a cross-section view of a pipe made in accordance with the invention.

As mentioned above, the invention provides a multilayer pipe 1 that is connectable, in particular to suction means or to propulsion means for transporting any fluid or material, and in particular an abrasive material.

In order to withstand being worn too fast by abrasion, at least one of the layers 2 of the pipe comprises a strip 3 wound helically in the form of touching turns, the strip 3 comprising a longitudinal support 4 and protective tiles 5 fastened to said support 4. In general manner, the support 4 is a material in strip form and the protective tiles 5 are fastened to one of the faces of the support. In the example shown, the support 4 is a tape, i.e. a flexible thin strip that may be made of a textile material, or of a synthetic material, or of rubber. The protective tiles 5 are fastened to the support by adhesive and they are organized on the support 4 in rows 6 presenting substantially parallel rectilinear longitudinal edges. Each row 6 of tiles 5 extends from one longitudinal edge 31 to the other longitudinal edge 31 of the strip 3. Each rectilinear longitudinal edge of a row of tiles is formed by an alignment of rectilinear edges of at least some of the tiles of said row of tiles. The term "rows presenting longitudinal edges that are substantially parallel" should be understood as meaning that the rows have longitudinal edges that are parallel to one another to within ±7°. Each row 6 of tiles is separated from an adjacent row 6 of tiles by an empty space forming a line 7 of separation. This space left empty corresponds to the space between the rectilinear longitudinal edges of two adjacent rows of tiles. Said longitudinal edges are substantially parallel to one another. The lines 7 of separation are parallel to one another.

In this example, the protective tiles 5 are made of ceramic. Each row 6 of tiles 5 is made up of n series of protective tiles 5, where n is an integer. When n is equal to 1, each tile 5 of said series of tiles 5 presents at least two substantially parallel edges suitable for forming the longitudinal edge of said row of tiles 5. When n is equal to or greater than 2, each tile 5 of at least two series of tiles presents at least one rectilinear edge suitable for forming a longitudinal edge of the row 6 of tiles 5. Each rectilinear longitudinal edge of a row of tiles 5 is thus formed by aligning one of the rectilinear edges of at least some of the tiles 5 of said row.

Figure 3:
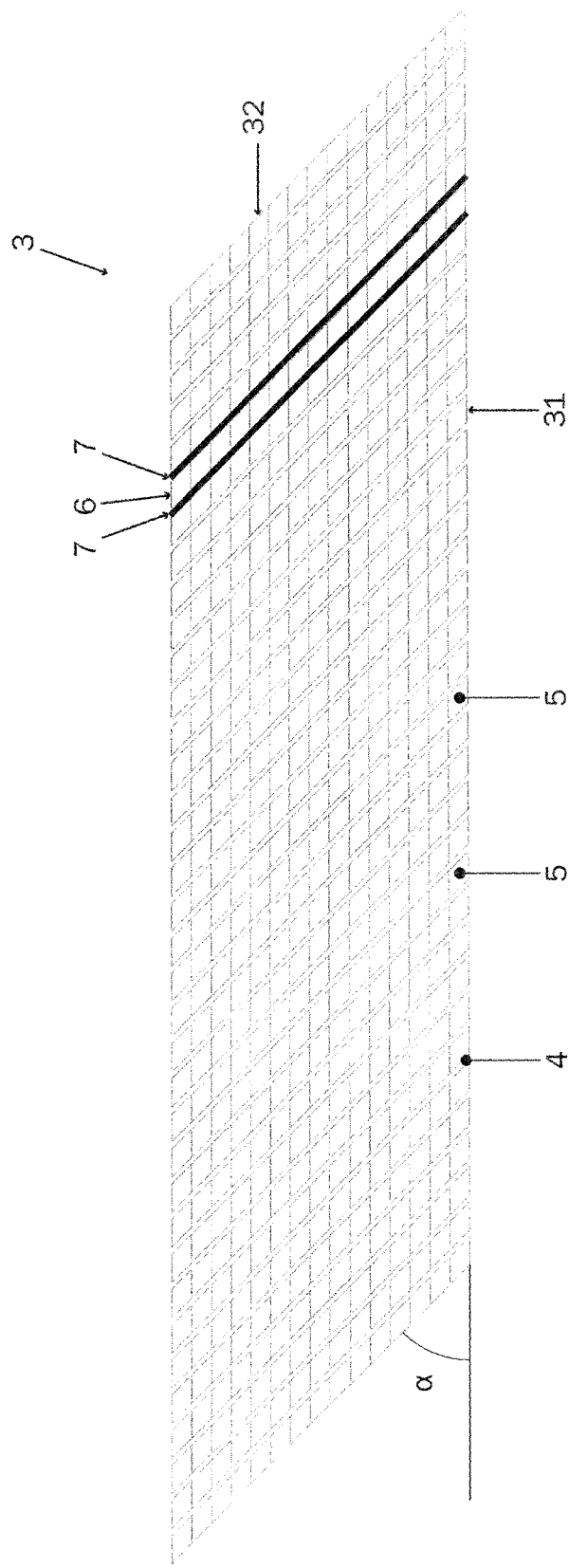
FIG. 3 is a view showing the strip flat prior to being wound.

In FIGS. 1 and 3, these protective tiles 5 are in the shape of parallelograms, and in this example in the shape of lozenges. This shape serves to reduce the gap between tiles. Naturally, without going beyond the ambit of the invention, it is possible to envisage tiles of other shapes, and preferably presenting at least two parallel opposite sides. As shown in FIG. 5, said parallel sides extend parallel to the line 7 of separation.

Each row of tiles may also be made up of at least two series of tiles as shown in the last diagram of FIG. 5. In this example, each row comprises two series of tiles, with each tile in a series having a rectilinear edge that forms, i.e. that co-operates in providing, a longitudinal edge of the row of tiles. The protective tiles 5 of FIGS. 1 and 3 in this example present a thickness of 4 millimeters (mm), and each of the sides of the lozenge presents a length equal to 8 mm. Each row of tiles is separated from an adjacent row 6 of tiles 5 by a gap having a width of 2 mm forming the line 7 of separation. In this example, each row of tiles is made up of fifteen tiles. The strip 3 as obtained in this way has two longitudinal edges 31 and two transverse edges 32 at its ends. Each line 7 of separation is of length equal to the circumference of the winding to be formed using said strip and it extends, in its width direction, from one longitudinal edge 31 to the other longitudinal edge 31 of the strip 3 while forming a non-zero angle other than 90° with each of the longitudinal edges 31 of the strip. The same applies to each row 6 of tiles. At least one, and in this example each of the transverse end edges 32 of the strip 3 is an edge at a chamfer that extends parallel to the lines 7 of separation.

In the example shown, the angle α is close to 45°.

Two lines of separation are drawn bold in FIG. 3 in order to visualize them more clearly. As result of this relative arrangement of the rows of protective tiles and of the longitudinal edges of the strip, it is possible for each of the lines 7 of separation between the rows 6 of tiles 5 to extend in a plane that is perpendicular to the longitudinal axis of the pipe 1 when the strip is in its wound state.

In the example shown, the pipe has a plurality of layers 2, one of which layers is formed by the above-described strip and another layer 8 is formed by a material that is elastically deformable, specifically in this example of rubber. The layer 8 of rubber is adjacent to the layer 2 comprising the strip with protective tiles. This rubber layer is made from a strip of rubber that is wound helically or that is laid in line. The rubber of said strip becomes inserted at least in part between the protective tiles of the layer that it covers over the lines of separation between the rows 6 of tiles. These layers become adhesively bonded to one another when the rubber is vulcanized. Naturally additional layers, e.g. made in the form of layers of textile material could also be provided. The support 4 of the protective tiles 5 may equally well be arranged on the inside or on the outside of the pipe, relative to said tiles 5.

Figure 4:
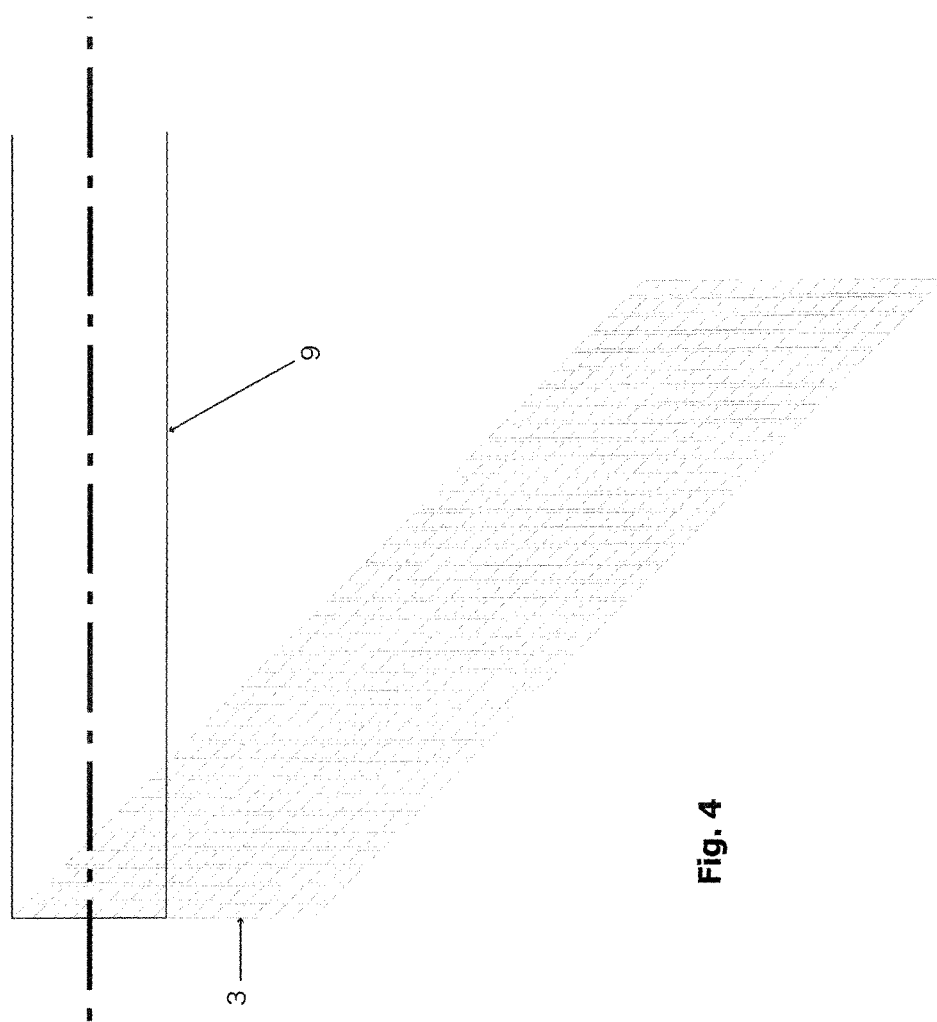
FIG. 4 is a diagrammatic view showing the step of winding the strip around the mandrel.

In order to fabricate such a pipe, the successive layers are placed around a mandrel 9 prior to vulcanization, when at least one of the layers comprises rubber. As shown in FIG. 4, in order to make the layer formed of the strip 3 having the protective tiles 5, the winding step is started by winding one of the transverse end edges 32 of the strip 3 around the mandrel in a circumferential plane of the mandrel. The winding angle or angle of inclination of the helix thus corresponds to the angle α formed between the lines 7 of separation and one of the longitudinal edges 31 of the strip.

The invention claimed is:

1. A multilayer pipe having at least one layer comprising a strip wound helically in the form of touching turns, said strip comprising a longitudinal support and protective tiles fastened to said support, said protective tiles being organized on said support in rows presenting rectilinear longitudinal edges that are substantially parallel, each row of tiles being separated from an adjacent row of tiles by an empty space forming a line of separation, the lines of separation being parallel to one another, wherein each of the lines of separation between rows of tiles extends in a plane perpendicular to the longitudinal axis of the pipe.

2. A pipe according to claim 1, each line of separation, of length equal to the circumference of the pipe at the level of said layer, extends from one longitudinal edge to the other longitudinal edge of the strip, while forming a non-zero angle other than 90° with each of the longitudinal edges of the strip, and in that at least one of the transverse end edges of the strip is a chamfered edge extending parallel to the lines of separation.

3. A pipe according to claim 1, wherein the angle (α) between each line of separation and one of the longitudinal edges of the strip lies in the range 20° to 80.

4. A pipe according to claim 3, wherein the angle (α) between each line of separation and one of the longitudinal edges of the strip is substantially 45°.

5. A pipe according to claim 1, wherein each row of tiles is made up of n series of protective tiles, n being an integer, and in that when n is equal to 1, each tile of said series of tiles presents at least two substantially parallel edges suitable for forming the longitudinal edges of said row of tiles, and in that, when n is equal to or greater than 2, each tile of at least two series of tiles presents at least one rectilinear edge suitable for forming a longitudinal edge of the row of tiles, each rectilinear longitudinal edge of a row of tiles being formed by aligning rectilinear edges of at least some of the tiles of said row.

6. A pipe according to claim 1, wherein each protective tile is made of a material that withstands abrasion and is preferably selected from the group formed by ceramics, and in that the protective tiles are fastened to the support by adhesive.

7. A pipe according to claim 1, wherein the longitudinal support is a tape.

8. A pipe according to claim 1, wherein the layer that is in the form of a helically-wound tape comprising a support together with protective tiles, is adjacent to a layer formed of an elastically deformable material that becomes inserted at least in part between said tiles in the lines of separation between rows of tiles.

9. A flexible strip of the type suitable for being wound helically in the form of a winding of touching turns to make a layer of a pipe in accordance with claim 1, said strip comprising a longitudinal support and protective tiles fastened to said support, said protective tiles being organized on said support in rows presenting rectilinear longitudinal edges that are substantially parallel, each row of tiles being separated from an adjacent row of tiles by an empty space forming a line of separation, the lines of separation being parallel to one another, the strip being characterized in that each line of separation, of length equal to the circumference of the winding, extends from one longitudinal edge to the other longitudinal edge of the strip while forming a non-zero (α) other than 90° with each of the longitudinal edges of the strip, and in that at least one of the transverse end edges of the strip is a chamfered edge extending parallel to the lines of separation.

10. A method of using a mandrel to fabricate a multilayer pipe, the method comprising a step of fabricating a layer of said pipe by helically winding in touching turns a strip comprising a longitudinal support and protective tiles fastened to said support, said protective tiles being organized on said support in rows presenting rectilinear longitudinal edges that are substantially parallel, each row of tiles being separated from an adjacent row of tiles by an empty space forming a line of separation, the lines of separation being parallel to one another, the method being wherein during the step of helically winding the strip around the mandrel, each line of separation is arranged in a plane perpendicular to the longitudinal axis of the mandrel.

11. A method according to claim 10, wherein each line of separation, of length equal to the circumference of the pipe to be made at the level of said layer, extends from one longitudinal edge to the other longitudinal edge of the strip while forming a non-zero angle (α) other than 90° with each of the longitudinal edges of the strip, and each transverse end edge of the strip is a "chamfered" edge extending parallel to the lines of separation, and the winding step is started by winding one of the transverse end edges of the strip around the mandrel in a circumferential plane of the mandrel.

* * * * *